E. L. DELANY.
FIRE HYDRANT.
APPLICATION FILED MAR. 31, 1911.

1,089,400.

Patented Mar. 10, 1914.

Witnesses:

Inventor
E. L. Delany
By his Attorney

UNITED STATES PATENT OFFICE.

EDWARD L. DELANY, OF NEW YORK, N. Y.

FIRE-HYDRANT.

1,089,400.  Specification of Letters Patent.  Patented Mar. 10, 1914.

Application filed March 31, 1911.  Serial No. 618,159.

*To all whom it may concern:*

Be it known that I, EDWARD L. DELANY, of the city of New York, State of New York, have invented certain new and useful Improvements in Fire-Hydrants; and I do hereby declare the following to be a full, clear, and exact description of the invention, such as will enable others skilled in the art to which it appertains to make and use the same.

This invention relates to that class of fire hydrants having means for exhausting from the casing the column of water that remains between the valve and the nozzle after the valve is closed, thus avoiding freezing in the casing.

My invention is also adapted to preventing leakage accumulating in the casing and contemplates operating an appropriate signal when a serious leak exists.

A device embodying my improvements may be attached to the ordinary hydrants in general use.

Figure 2:
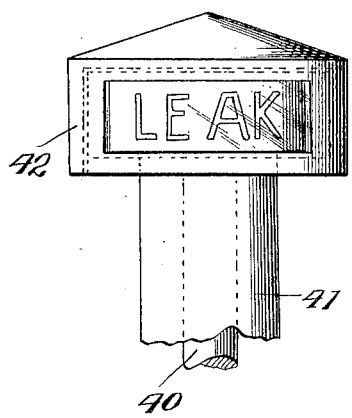
Figure 1:
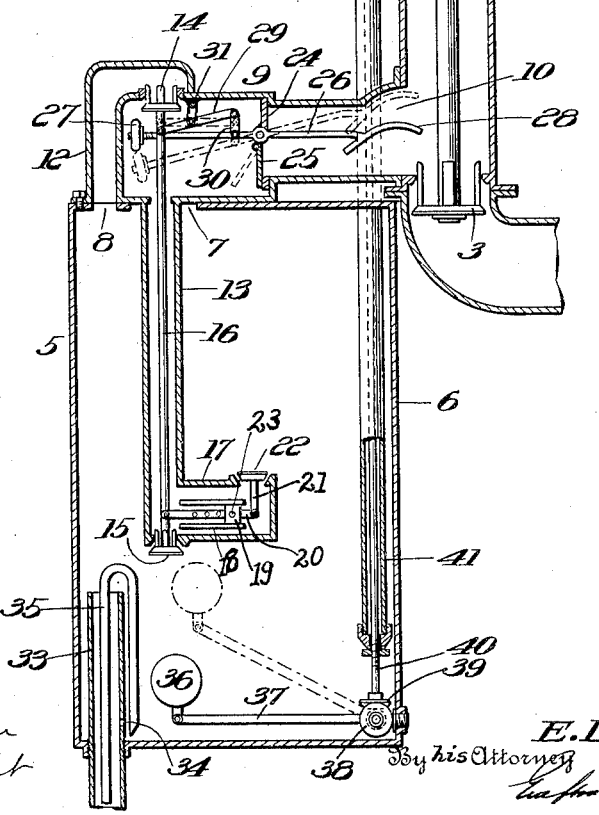

In the drawing, Figure 1 is a vertical sectional view of a form in which the invention may be embodied. Fig. 2 is an elevation of the indicator.

Referring to the drawing 1 designates the hydrant casing of the usual or any preferred form extending approximately two feet above ground and four feet beneath and having a nozzle 2 for hose attachment.

3 designates the valve and 4 the stem extending upward through and beyond the top of the casing.

My improvement comprehends a trap or basin placed under ground, in communication at its top with the lower portion of the hydrant casing and having an outlet at its bottom leading to a sewer.

5 designates the trap. As shown it comprises a housing 6 having two openings 7, 8, in its top, and a casing 9 leading from a port 10 in the valve casing 1, the casing 9 being adapted to be bolted to the housing 6 and having two branches 12, 13, branch 12 registering with opening 8 of the housing and branch 13 extending about three feet down into the housing through opening 7. Communication between casing 9 and the trap 5 through branches 12 and 13 is controlled by valves 14 and 15 having a common stem 16.

I have shown the part 13 formed at its lower end with a lateral extension 17 having guides 18 in which a block 19 is movable and constitutes the fulcrum for a lever 20 secured at one end to stem 16 and having an upright arm 21 at its other end carrying a valve 22 seated in a port formed in the top wall of the extension 17 and opening outward when stem 16 lowers. The block 19, being movable in the guides, may be adjusted, as by a pin 23, at any desired point in the length of lever 20.

The casing 9 is shown provided interiorly with a depending bracket 24 on which is fulcrumed a check valve 25 adapted to swing and allow water to flow past it from the hydrant casing 1 toward the trap 5 but preventing flow in the opposite direction. Also fulcrumed on the bracket 24 I have shown a lever arm 26 weighted at its rear end, as by an adjustable nut 27, and having its forward end extended a short distance into casing 1 and preferably formed with a widened and curved extremity 28. The lever arm is connected with valve stem 16 by links 29 and 30, the link 29 being fulcrumed on casing 9 as at 31.

The normal position of lever arm 26 when the hydrant is not in use, is shown in full lines, the arm lying substantially horizontal, with its curved extremity 28 projecting into casing 1, and, through links 29, 30, holding valve stem 16 lowered and valves 14, 15 and 22 unseated.

The housing 6 is provided with an outlet pipe 33 shown leading through the bottom of the housing and adapted to connect with a sewer pipe. The pipe 33 extends well up into the housing and is formed with a port 34 near the bottom of the housing. A siphon 35 is shown in the outlet pipe, its bend being above the top of the pipe and its short leg extending down into the basin. A float 36 is mounted on a rod 37 pivoted near the bottom of the trap. This rod is provided with a pinion 38 meshing with a gear wheel 39 keyed on the lower end of a shaft 40 within a rigid sleeve 41, the shaft and its sleeve extending to any point of the hydrant casing above ground, as 42. The sleeve may carry any suitable sign, as the word "Leak" which will be visible through a slot in the cap on the end of the shaft when the latter is partially rotated consequent upon the rise of float 36.

In practice, as valve 3 is operated to obtain a flow of water from the hydrant, the pressure on valve 14 when the column of water in the hydrant extends above the lower wall of the nozzle, will hold valve 14 seated as against the pressure of the water acting on valves 15 and 22. When, however, valve 3 is closed and the water level in the hydrant 1 falls to, or below, the lower wall of nozzle 2, then the pressure acting on valve 14 will be lessened and will be overcome by the pressure on valves 15 and 22. Thus under a flow of water from the hydrant the trap 5 is held closed, while the cessation of flow opens the trap and allows the water to pass through it from the hydrant. Hence lever arm 26 in not a necessary element but it materially aids the operation as it tends to overcome the balance of the valves. When water is flowing from the hydrant, pressure against the curved extremity 28 of the lever arm 26 will swing the arm to the position shown in dotted lines, also swinging link 29 and elevating stem 16 to close valves 14, 15 and 22. When, however, the flow of water from the hydrant is discontinued, by closing valve 3, the upward pressure previously exerted on arm 26 ceases, and the flow of the column of water downward in the hydrant presses the end 28 of arm 26 downward and unseats the valves, allowing the water to pass from the hydrant to casing 9 and basin 5 and thence to the sewer, thus completely emptying the hydrant. This rush of water into the basin cannot pass through the small outlet 34 at once and hence it will overflow the upper end of pipe 33 and reach the height of the bend in the siphon when the basin will be quickly drained. The rise and fall of the float 36 is so quickly accomplished that the momentary display of the signal at 42 is unimportant.

When the hydrant is not in use there may exist a slight leakage at valve 3 and this will pass to the casing 9 and branch 13. As it fills the latter and extension 17, its weight will unseat valves 15 and 22 against the retarding influence of arm 26, and the water will pass through outlet 34 without collecting in the basin. When, however, a serious leak occurs at valve 3 and the water enters the basin faster than it can exhaust through port 34 the water will rise to the height of pipe 33 and then pass into the latter. The rise of the water elevates the float and partially rotates shaft 40 to display the signal and the signal will remain in view while the float remains elevated as shown in dotted lines. In this connection it will be noted that the bend of the siphon is well above the pipe 33 so that any collection of water which can be carried off by the pipe will hold the float at the elevation of the top of the pipe without causing the siphonic action.

The purpose of the valve 22 and its connections with the stem 16 is to insure the proper actions resulting from the differences in pressures on valves 14, 15 and 22. The average height of the hydrant casing 1 from port 10 to nozzle 2 is about five feet. Assuming that branch 13 is three feet in length, the relative sizes of valves 14, 15 and 22 may readily be determined in order to control the pressures. It may occur, however, that in adapting the device to larger hydrants valve 14 may not be of the required relative area. If it be too small, for instance, so that the pressure upon it would be overcome by that acting on valves 15 and 22 before the water supply reached the full height of the hydrant, then by adjusting the fulcrum block 19 at the position shown the tendency of the pressure acting on valve 22 to overcome that acting on valve 14 will be reduced, whereas if valve 14 should be of too great an area block 19 may be moved nearer to stem 16 thus increasing the leverage on the valve stem.

I claim as my invention:—

1. In a fire hydrant, the combination with a hydrant casing having a valve, of a trap in communication with the lower end of said casing, a valve in said trap, means automatically actuated on closing said first mentioned valve for opening the valve in said trap for conducting water remaining in said casing through said trap to an outlet, and means controlled by the pressure of the outflowing water through said casing for closing the valve in said trap for preventing loss of water through the latter when said hydrant valve is open.

2. In a fire hydrant, the combination with the hydrant casing having a valve, of a trap in communication with said casing and adapted to receive water leaking past said valve, means for preventing back flow from said trap, a signal at or near the top of said hydrant, and means actuated by the rise of water in said trap for operating said signal.

3. The combination with a hydrant, of a trap, a pipe leading from the hydrant casing to said trap, a valve in said pipe, a lever arm fulcrumed in said pipe having a widened portion extending into the path of the water flowing through said hydrant, said widened portion being at right-angles to such path so as to be actuated thereby, and connections between said valve and said arm for opening and closing said valve for the purpose stated.

4. The combination with the hydrant, of a trap connected with said hydrant near the base thereof and adapted to drain said hydrant when the flow of water therethrough is discontinued, said trap having an outlet pipe vertically disposed therein, a port being formed in said pipe near the bottom of said trap, and a siphon in said pipe having its bend above the top thereof and its short leg extending into said trap, for the purpose stated.

5. The combination with the hydrant, of a trap connected with said hydrant near the base thereof and adapted to drain said hydrant when the flow of water therethrough is discontinued, said trap having an outlet pipe vertically disposed therein, a port being formed in said pipe near the bottom of said trap, a signal on said hydrant, a float in said trap, and means actuated by the rise of said float to the height of said outlet pipe for actuating said signal.

6. The combination with the hydrant and the trap at the base thereof, of a casing on said trap in communication with said hydrant, said casing having a depending branch extending into said trap and having a second branch communicating with said trap and leading from said casing at a point in line with said former branch, a valve for each of said branches having a common stem, a lever arm fulcrumed in said casing and extending into said hydrant, and links connecting said valve stem with said arm, for the purpose stated.

In testimony whereof, I have signed this specification in the presence of two subscribing witnesses.

EDW. L. DELANY.

Witnesses:
GRAFTON L. MCGILL,
FRANCES STREIT.

---

Copies of this patent may be obtained for five cents each, by addressing the "Commissioner of Patents, Washington, D. C."